April 3, 1951  C. S. HELMAN ET AL  2,547,264
FISH LURE
Filed May 13, 1948  2 Sheets-Sheet 1
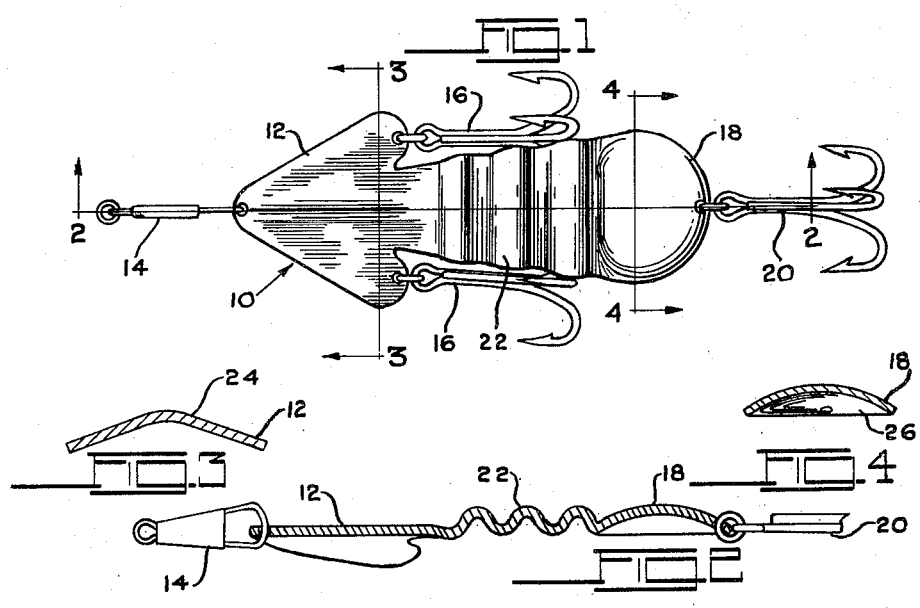
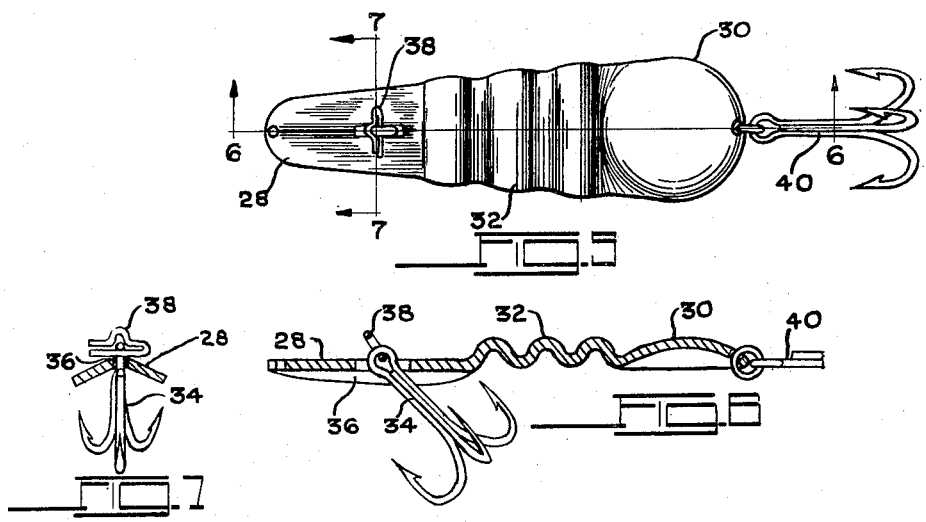
INVENTOR
CLIFFORD S. HELMAN
& ARCH R. BLUNK
BY
Toulmin & Toulmin
ATTORNEYS

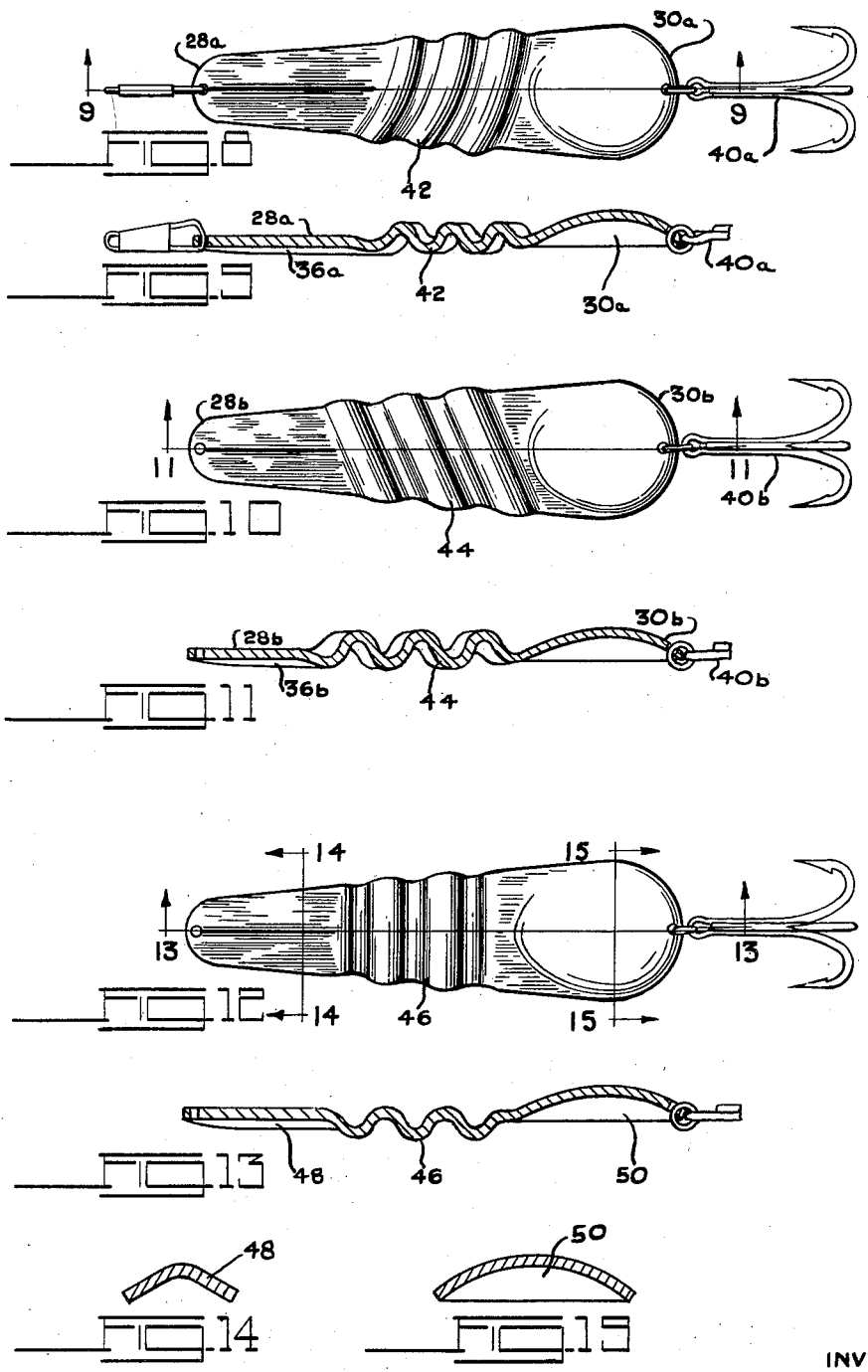

Patented Apr. 3, 1951

2,547,264

UNITED STATES PATENT OFFICE 2,547,264

FISH LURE

Clifford S. Helman and Arch R. Blunk,
Dayton, Ohio

Application May 13, 1948, Serial No. 26,838

3 Claims. (Cl. 43—42.5)

This invention relates to artificial fish lures, and particularly to such lures when made to resemble a minnow or small fish.

Many types of fish lures have been developed and marketed, but the most satisfactory results have been obtained by simulating the natural food of the fish which it is desired to catch. In general, a lure of this nature would resemble a minnow or small fish.

A lure simply manufactured to resemble a minnow or small fish, however, is ordinarily not sufficiently active in the water to duplicate the motion of such a fish or minnow and thus lacks a great deal in attractiveness to game fish which it is supposed to appeal to.

The primary object of this invention is to provide an artificial fish bait or lure which will resemble a fish or minnow when being drawn through the water and which is so constructed that it will be active in fish-like motions and thereby have added attraction for the game fish.

A still further object is the provision of a fish lure of the general type which is useful in a great variety of sizes from large and heavy lures which are used in catching salt water game fish to small light lures which can be used for fly rod fishing or casting.

It is also an object to provide an artificial bait which is substantially indestructible and which can be used for a long period of time.

A still further object is the provision of a fishing lure which is relatively simple to produce and is, therefore, inexpensive.

Another object of this invention is the provision of a fishing lure having hooks which is so constructed that the hooks can readily be removed from or securely placed on the lure without the use of any tools.

These and other objects and advantages will become more apparent upon reference to the following description taken in connection with the accompanying drawings in which:

Figure 1 is a plan view looking down on one form of fishing lure according to this invention;

Figure 2 is a vertical longitudinal section thereof indicated by the line 2—2 on Figure 1;

Figure 3 is a transverse section through the forward end of the lure and as indicated by the line 3—3 on Figure 1;

Figure 4 is a transverse section through the rear end of the lure and as indicated by the line 4—4 on Figure 1;

Figure 5 is a plan view of another form which the fishing lure of this invention may take;

Figure 6 is a vertical longitudinal section thereof indicated by the line 6—6 on Figure 5;

Figure 7 is a transverse section taken through the forward end of the lure and showing the configuration thereof and the manner of securing a hook thereto and as indicated by the line 7—7 on Figure 5;

Figure 8 is a plan view of a fishing lure similar to that shown in Figure 5, but having a slightly different configuration in the intermediate portion thereof;

Figure 9 is a vertical section indicated by the line 9—9 on Figure 8;

Figure 10 is a plan view showing a lure similar to that illustrated in Figures 5 and 8, but with still another intermediate configuration;

Figure 11 is a vertical longitudinal section indicated by the line 11—11 on Figure 10;

Figure 12 is a plan view of a lure similar to that shown in Figure 5 but having the corrugations in the center thereof extending downwardly from the plane of the lure rather than upwardly as in Figure 5;

Figure 13 is a vertical longitudinal section taken through the lure of Figure 12 and as indicated by the line 13—13 thereon; and Figures 14 and 15 are transverse sections indicated by the lines 14—14 and 15—15, respectively, on Figure 12.

Referring to the drawings, the lure shown in Figures 1 through 4 comprises a main body part 10 having a substantially triangular forward part 12 to the tip of which is attached a clip 14 for receiving a leader or swivel and to the rearmost corners of which are attached the gang hooks 16.

The body 10 extends rearwardly from the base of the arrow shaped head 12 and terminates in a rounded part 18 which may carry a gang hook 20. The intermediate part of the body between the triangular forward end 12 and the rounded rear end 18 consists of a series of transversely extending corrugations or undulations 22 which, as best seen in Figure 2, extend generally upwardly from the plane of the body of the lure. Both the forward and rear ends of the lure are generally concave downwardly as indicated at 24 in Figure 3 and at 26 in Figure 4.

The purpose of the particular configuration described above is to make the lure very active when drawn through the water so that it darts to and fro simulating the movement of a minnow or fish. This makes the lure very attractive to game fish and they quite readily strike under most circumstances.

All of the reasons for the action of the lure as produced by the corrugations 22 and the concave downwardly and forward and rear ends are not exactly understood, but this combination of concave ends and corrugated intermediate portion has been arrived at by a series of tests and by experiment, and it has been found that this arrangement of the lure produces that action thereof which is most likely to attract the fish.

It may be presumed that the concave downwardly forward and rearmost ends of the lure have a tendency to make it somewhat unstable in the water whereby it will tend to oscillate about a longitudinal axis. It will be noted that the lateral tips of the arrowhead forward end of the lure in Figure 1 are substantially flat and extend downwardly and outwardly from the concave center part as fins would on a fish. Similarly, the upwardly extending corrugations prevent streamline flow of the water lengthwise of the lure, and thus gives the lure a darting or bobbing action as it is drawn through the water. In any case, a lure constructed as shown in Figure 1 is highly active in the water and because of this simulates the movement of a small fish or minnow. The triangular shaped head at 12 is likewise of effect in this simulation because the rear corners of the triangular head part resemble lateral fins of a small fish.

The preferred material to construct the lure from is metal and may comprise any of several corrosion resistant metals such as brass, copper or stainless steel, or may consist of ordinary steel plated with a suitable corrosion resistant coating. The lure may also be formed of glass or plastic, or any of several well known laminates having sufficient strength to withstand strikes to which the lure may be subjected.

It will be understood, of course, that the lure can be painted with different colors or formed of materials of different colors if found desirable. It will further be evident that the lure could be made in a plurality of sizes ranging from very small lures to be used for fly casting and weighing only a fraction of an ounce, to very large lures such as might be used in salt water for larger game fishing and weighing several ounces.

Figures 5, 6 and 7 illustrate another form which the lure of this invention may take and wherein the triangular forward end is eliminated and the body part merely tapers from a rounded forward end 28 to a larger and also rounded rear end 30. As in the case of the lure of Figures 1 through 4 the forward and rear ends of the lure of Figures 5 through 7 are also generally concave downwardly and the intermediate portion of the body comprises the transversely extending corrugations 32.

In place of the two gang hooks 16 carried at the sides of the end 12 of the lure shown in Figure 1, the lure of Figures 5 through 7 comprises a single gang hook at the forward end indicated at 34 and which has its shank end extending through a slot 36. This slot 36, as will be noted, prevents any substantial lateral movement of the hook, but does not interfere with longitudinal movement thereof. For retaining the hook in position in the slot 36 there may be provided the spring clip 38 which snaps through the eye in the hook shank and retains it in position. This snap arrangement is of great advantage because, while providing a secure fastening for the hook, at the same time permits changing of the hook without the use of any tools and with a minimum of time and effort. The lure of Figures 5 through 7 preferably also includes a gang hook 40 at the rear end thereof.

In Figures 8 and 9 there is shown a lure substantially identical with that illustrated in Figures 5 through 7, except that the forward hook has been eliminated and the transverse corrugations 42 have been arranged on the intermediate part of the body so as to extend at an angle thereto and are formed arcuately.

The forward and rear ends of the lure are concave downwardly as in the case of the previously described modifications and also similarly thereto the lure is highly active in the water.

An additional feature to be found in connection with the lure of Figures 8 and 9 is that the inclined corrugations 42 have a tendency to give the lure a bias toward one side as it is drawn through the water, so that the movement of the said lure simulates that of a crippled or wounded fish. This has a tendency to make the lure even more attractive to game fish and a correspondingly greater number of strikes result.

The lure shown in Figures 10 and 11 is substantially identical with that shown in Figures 5 through 7, 8 and 9, except that the transverse corrugations 44 in Figures 10 and 11 extend in straight lines but are inclined at an angle to the longitudinal axis of the lure. The arrangement of Figures 10 and 11, similarly to that of Figures 8 and 9, tends to bias the lure sidewardly so that its motion in the water simulates that of a crippled or wounded fish.

The parts of the lure shown in Figures 8 through 11 which correspond to parts of the lure in Figures 5 through 7 are correspondingly numbered with the addition, respectively, of a subscript $a$ and a subscript $b$.

Figures 12 through 15 show a construction wherein the corrugations 46 between the concave downwardly forward end 48 and the concave downwardly rear end 50, undulate in the opposite directions to the corrugations of the previous modifications. This will be seen in Figure 13 wherein it will be noted that the corrugations, in general, are downwardly from the plane of the lure rather than upwardly.

It has been found that the corrugations may be formed as shown in Figures 12 and 13 without materially detracting from the action of the lure when it is in the water. It will be understood that the corrugations 46 could be curved as shown in Figure 8, or inclined at an angle to the longitudinal axis of the lure as shown in Figure 10 if so desired.

It will also be understood that the weed guards and similar auxiliaries could be employed in connection with the hook if so desired, and that this likewise would not detract from the action of the lure when in the water.

It will be understood that this invention is susceptible to modification in order to adapt it to different usages and conditions and, accordingly, it is desired to comprehend such modifications within this invention as may fall within the scope of the appended claims.

We claim:

1. A fishing lure having a substantially flat body part adapted for supporting gang hooks, said body part having undulations extending generally transversely across the intermediate portion thereof, a spherical configuration at the rear end of said body part, and a wide angle V-shaped channel at the forward end thereof, said channel and said spherical configuration both opening in the same direction, and said undulations extending from said body part toward the closed sides of said concavities, the base of the channel being substantially in the plane of the lower surface of the undulations.

2. A fishing lure having a substantially flat body part adapted for supporting gang hooks, said body part having undulations extending generally transversely across the intermediate portion thereof, a spherical configuration at the rear end of said body part, and a wide angle V-shaped channel at the forward end thereof, said channel and said spherical configuration both opening in the same direction, and said undulations extending from said body part toward the open sides of said concavities, the base of the channel being substantially in the plane of the lower surface of the undulations.

3. A fishing lure having a substantially flat elongated body part adapted for supporting gang hooks, said body part having undulations extending generally transversely across the intermediate portion thereof, a spherical configuration at one end of said body part, and a wide angle V-shaped channel at the other end, said channel and spherical configuration both opening in the same direction, and said undulations extending substantially entirely to one side of the said body part, the base of the channel being substantially in the same plane as said body part and, therefore, in the same plane as one of the surfaces of said undulations.

CLIFFORD S. HELMAN.
ARCH R. BLUNK.

REFERENCES CITED

The following references are of record in the file of this patent:

UNITED STATES PATENTS

| Number | Name | Date |
| --- | --- | --- |
| 1,609,090 | Knill | Nov. 30, 1926 |
| 1,938,266 | Tucker | Dec. 5, 1933 |